United States Patent [19]

Domenig

[11] Patent Number: 5,169,237
[45] Date of Patent: Dec. 8, 1992

[54] SUPPORTING AND GUIDE ROLLER FOR PULL-OUT GUIDES FOR DRAWERS

[75] Inventor: Georg Domenig, Kernersville, N.C.

[73] Assignee: Grass AG, Hochst/Vlbg., Austria

[21] Appl. No.: 594,311

[22] Filed: Oct. 9, 1990

[51] Int. Cl.⁵ .............................................. F16C 29/04
[52] U.S. Cl. ...................................... 384/19; 384/50; 384/58
[58] Field of Search ................ 384/58, 50, 19, 125, 384/416

[56] References Cited

U.S. PATENT DOCUMENTS

| | | | |
|---|---|---|---|
| 2,912,288 | 11/1959 | Griswold | 384/58 |
| 4,601,522 | 7/1986 | Röck | 384/19 |
| 4,878,630 | 11/1989 | Schmid | 384/58 |
| 5,000,583 | 3/1991 | Shen | 384/58 |

*Primary Examiner*—Lenard A. Footland

[57] ABSTRACT

A supporting and guide roller for pull-out guides for drawers comprises a roller body made of hard material, the shell surface of the roller body forming a first rolling surface, at least one circumferential groove being arranged in the area of the first rolling surface and being filled with an elastic material, which forms a second rolling surface when the roller is not under load and projects a certain amount over the first rolling surface. The second rolling surface is arranged in the area of a wider notch in the roller body extending in the peripheral direction of the roller. When the soft rolling surface is under load, the material of the soft rolling surface is displaced into the area of the notch.

7 Claims, 1 Drawing Sheet

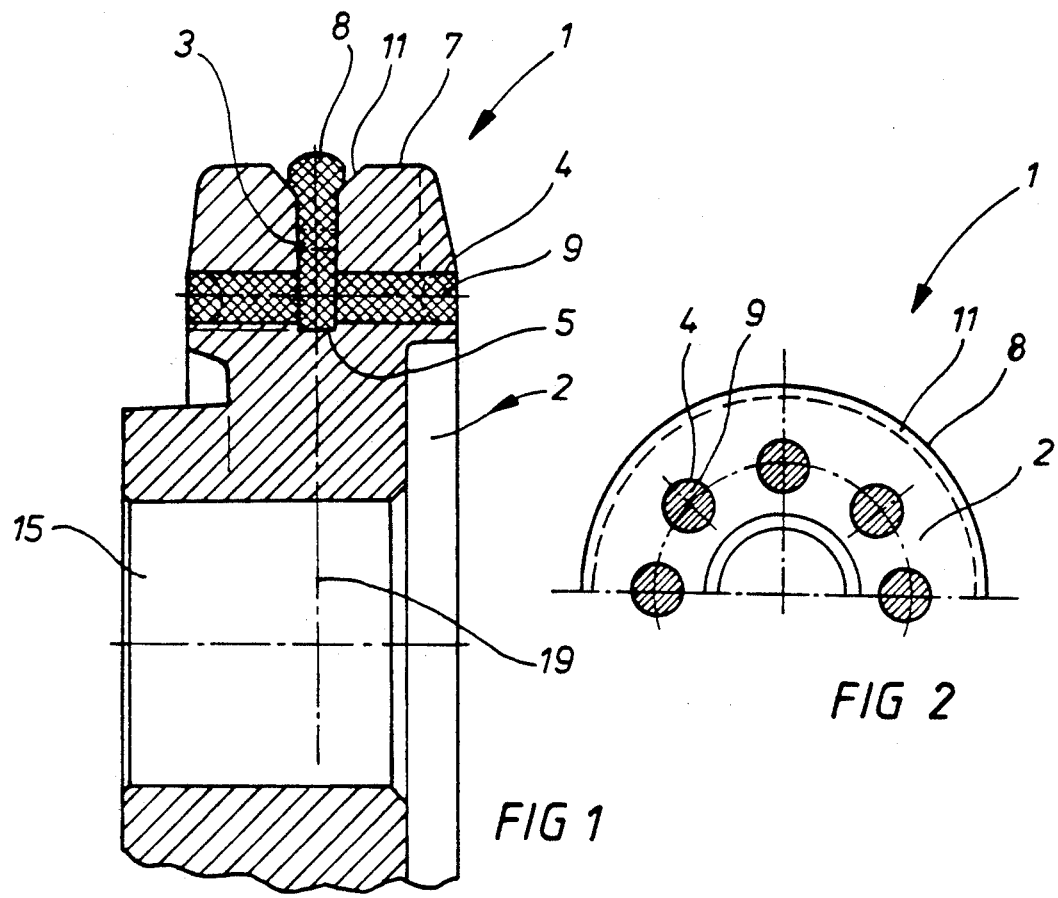
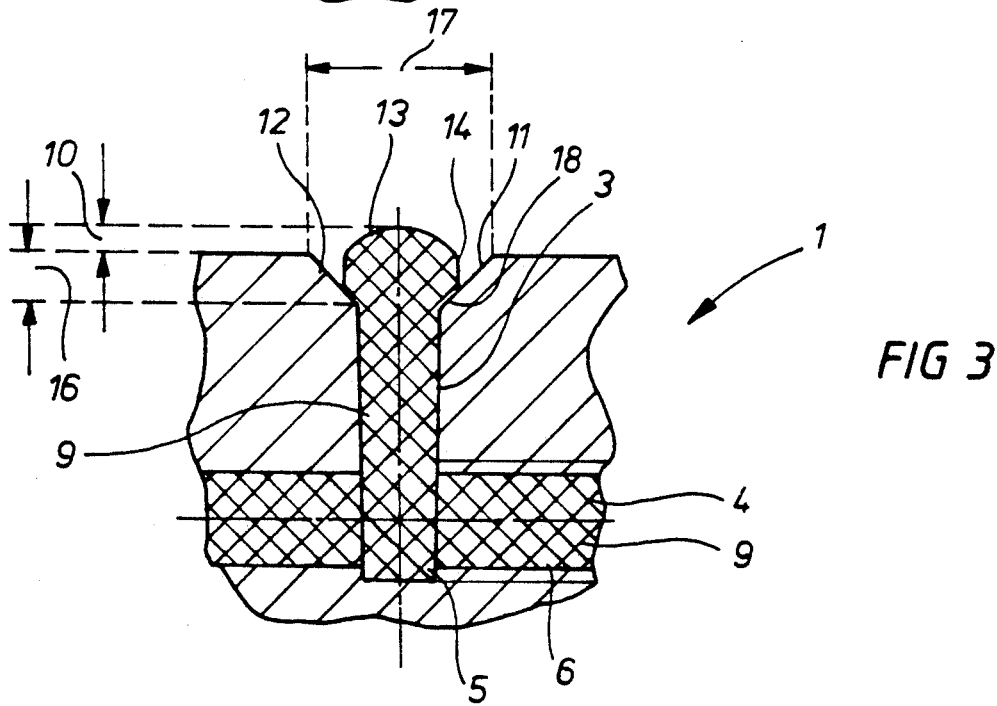

SUPPORTING AND GUIDE ROLLER FOR PULL-OUT GUIDES FOR DRAWERS

BACKGROUND OF THE INVENTION

The present invention relates to a supporting and guide roller for pull-out guides for drawers. This kind of roller has become known through patents DE-AS 20 18 132 and AT-PS 317 473. According to these patents, the second and softer rolling surface is first to bear a normal load and, as the load increases, the soft rolling surface is deformed radially inward and the load transfer is then carried out through the hard, first rolling surface.

DE-GM 71 29 122 provides an O-ring for this purpose that extends over the periphery of the hard rolling surface. However, the disadvantage of this design is that the O-ring rubs and chafes on the groove base and begins to shrink and thicken under large loads and thus spreads out and shears off. The service life of this kind of known roller is thus relatively short.

It is known through German patent 35 07 821 filed by the same assignee that the service life can be improved by injecting elastic material of the softer rolling surface into a radially running groove intersecting transverse boreholes in an equidistant arrangement on the same radius in the peripheral direction of the roller. In this way, the transverse boreholes are also filled with the soft elastic material together with the groove, which improves the service life considerably.

SUMMARY OF THE INVENTION

The object of the present invention is to further improve the service life of a supporting and guide roller of the type mentioned in the beginning.

The invention achieves this object in that the second rolling surface is arranged in the area of a widened notch in the roller body extending in the peripheral direction of the roller.

The essential advantage achieved thereby is that the elastic material of this rolling surface can now be displaced into the invented notch in the area of the hard roller body when the soft rolling surface is under load. Thus, the soft elastic plastic ring is not jammed in the vertical groove, and the side flanks of this plastic ring do not chafe and shrink and thicken on the radially outer groove walls of this groove.

This avoids fatigue phenomena in the area of the plastic ring made of soft material, this plastic ring forming the second, softer rolling surface. The width and depth of the notch will preferably be dimensioned so that the elastic material will be displaced into the notch when the soft rolling surface is under load.

The specialist is free to choose the actual dimensioning of the width and depth of the notch. The precise dimensions will depend, among other things, on the hardness of the elastic material and the required supporting properties of this elastic material.

The only thing required is that, when the elastic material of the second, softer rolling surface is displaced radially inwards because of a greater roller load, the displaced material can be distributed in the notch of the roller body without the walls of the notch shrinking and thickening or even shearing off.

Preferably, the notch will flare radially outward because this will form inclined flanks on which the soft elastic material of the second rolling surface can be supported and distributed.

Instead of flaring outwardly, the notch can, according to the invention, also have vertical flanks that form a clearance from the vertical flanks of the softer plastic ring.

It is also possible for the outwardly flaring flanks of the notch to be convex.

In a further development of the invention, the soft rolling surface has a convex rounding.

The advantage of this rounded off rolling surface is prevention of a lateral running and "flowing" of this soft rolling surface under load.

It is also preferred for the soft material of the rolling surface to have straight, vertical side flanks, which change into narrowing flanks that are seated on also inclined flanks on the base of the notch.

What this achieves is that the load transferred radially to the soft ring is first transferred to the lateral inclined flanks of the notch and only then through the groove cross-section to the transverse borehole.

It is preferred here for the groove base of the radial groove to be arranged below the bottom edge of the transverse borehole, because the groove base will then be supported on the inside on an offset groove surface in the hard roller body.

The subject-matter of the present invention arises not only from the individual patent claims but also from a combination thereof. All data and features disclosed in the documentation, including the abstract, particularly the spatial arrangement depicted in the drawings, are claimed as essential to the invention to the extent they are new compared to the art, either individually or in combination.

The invention is explained in more detail by means of solely one embodiment illustrated by the drawings. The drawings and their description will indicate further features and advantages of the invention.

BRIEF DESCRIPTION OF THE DRAWINGS

FIG. 1 is a partial cross-section through the invented roller.

FIG. 2 is a side view of the roller with intersected transverse boreholes.

FIG. 3 is a detail of FIG. 1.

DESCRIPTION OF THE PREFERRED EMBODIMENT

The supporting and guide roller 1 according to the invention is basically described in the assignee's patent 35 07 821 or in U.S. Pat. No. 4,647,225. Reference is made to the disclosures therein, which are included in full in the present invention.

The supporting and guide roller 1 has a roller body 2 made of a relatively hard plastic material, which provides a middle, central receiving borehole 15 for insertion of a spindle.

The roller body 2 has a radially extending groove 3, the opening thereof lying radially outward being formed by a flaring notch 11.

The radial circumferential groove 3 intersects transverse boreholes 4, which are arranged equidistantly in the peripheral direction with axial longitudinal extension in the roller body 2.

A soft, elastic material 9 is injected into the groove 3 as well as into the transverse boreholes 4; it extend radially over the groove 3 and thus forms a soft rolling surface 8.

The peripheral surface of the roller body 2 forms a hard rolling surface 7. In the unloaded condition, the roller 1 supports only the rolling surface 8. The "unloaded condition" is understood here to mean the load on the guide roller when the drawer is not under load. The drawer thus operates practically without noise because the drawer load is transferred through the soft rolling surface 8. As the load 8 on the drawer increases, the soft rolling surface 8 is displaced until the amount 10 is exceeded and the hard rolling surface 7 takes over the essential part of the load transfer.

It is important for the soft rolling surface 8 to have a convex rounding 13 and to be arranged by the amount 10 over the hard rolling surface 7.

The soft material 9 forms inclined flanks 18 on the base of the notch 11, which are seated on the also inclined flanks 12 of the notch 11.

Since the width of the rolling surface 8 is greater than the width of the groove 3 in the axial direction of the roller 1, there is a supporting effect of the soft rolling surface 8 in the area of the flaring notch 11.

Thus, a substantial part of the load acting on the soft rolling surface 8 is already absorbed in the area of the notch 11 and does not act through the vertical groove 3 on the transverse borehole 4.

To improve the load transfer further, the groove base of the groove 3 forms a lower shoulder 5 that extends below the bottom edge 6 of the transverse borehole 4, so that there is support here too of the drawer load acting on the soft rolling surface 8.

In a preferred example embodiment of the invention, the side flanks 14 connected to the inclined flanks 18 are vertical and straight. In another embodiment, however, these side flanks 14 can also be convex.

The depth 16 of the notch 11 and the width 17 are dimensioned so that the material of the soft rolling surface 8 is displaced completely into the upwardly opening notch 11 when the drawer load is absorbed essentially only by the hard rolling surface 7.

Because of the invented design of the soft rolling surface in conjunction with the flaring notch, the material of the rolling surface does not shrink and thicken and rub and chafe on the walls of the notch 11 or the walls of the groove 3. This considerably improves the service life of the invented supporting and guide roller.

The present invention encompasses not only the embodiment shown here, which provides for the vertical groove 3 to intersect corresponding transverse boreholes 4 in the roller body 2.

The transverse boreholes 4 can also be eliminated entirely, leaving only the vertical groove 3 with the invented design of the rolling surface 8 in connection with the notch 11.

It is also possible to design the roller 1 in two parts, dividing it, for example, in the area of the center transverse line 19, giving two roller parts held together by fastening means not described in more detail (screws, rivets or cementing). It is possible here too to provide these transverse boreholes 4 or leave them out, providing only the vertical groove 3 with the soft rolling surface 8.

In a further embodiment, the soft material 8 is not injected into the groove and the transverse boreholes, rather the material is an O-ring, which is seated with its correspondingly beveled supporting flanks on the associated flanks 12 of the flaring notch 11.

Instead of the tapering flanks 12 shown here, use can also be made of vertically running flanks 12, which are spaced away from the also vertically running flanks 14. The flanks 12 and 14 are then parallel to each other and spaced equidistantly.

The flanks 18 in this embodiment are directed horizontally and run parallel to the longitudinal axis of the roller body also parallel to the longitudinal axis of the transverse boreholes 4), so that this embodiment also provides for the desired supporting effect of the soft material 8 on the associated flanks 12 in the area of the notch 11.

What is claimed is:

1. Supporting and guide roller for pull-out guides for drawers, comprising a roller body made of hard material, the shell surface thereof forming a first rolling surface, at least one circumferential groove being arranged in the area of the first rolling surface and filled with an elastic material forming a second rolling surface that projects a certain amount radially over the first rolling surface when the supporting and guide roller is not under load, the material forming the second rolling surface being arranged in the roller body in the area of a widened notch extending in the peripheral direction of the roller body.

2. Roller as described in claim 1, wherein the width and the depth of the notch are dimensioned so that the elastic material is displaced into the notch when the second rolling surface is under load.

3. Roller as described in claim 1 or 2, wherein the notch flares radially outward.

4. Roller as described in claim 1, wherein the second rolling surface has a convex rounding.

5. Roller as described in claim 1, wherein the notch includes a base and the elastic material of the second rolling surface has straight and vertical side flanks, which change into narrowing flanks that are seated on also inclined flanks on the base of the notch.

6. Roller as described in claim 1 wherein the width of the second rolling surface in the axial direction of the roller body is greater than the axial width of the circumferential groove.

7. Roller as described in claim 1, wherein the roller body has opposing axial faces and the circumferential groove includes a base and wherein the circumferential groove intersects transverse boreholes, each having a bottom edge, in equidistant arrangement in the peripheral direction of the roller body on the same radius and extending to at least one axial face of the roller body, and the groove base of the circumferential groove is arranged below the bottom edge of the respective transverse boreholes.

* * * * *